US011461030B2

(12) United States Patent
Chen et al.

(10) Patent No.: US 11,461,030 B2
(45) Date of Patent: Oct. 4, 2022

(54) TRANSFERRING DATA BETWEEN CLOCK DOMAINS USING PULSES ACROSS A QUEUE

(71) Applicant: Micron Technology, Inc., Boise, ID (US)

(72) Inventors: Yueh-Hung Chen, Sunnyvale, CA (US); Chih-Kuo Kao, Fremont, CA (US); Ying Yu Tai, Mountain View, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 3 days.

(21) Appl. No.: 16/916,926

(22) Filed: Jun. 30, 2020

(65) Prior Publication Data

US 2021/0019071 A1    Jan. 21, 2021

Related U.S. Application Data

(60) Provisional application No. 62/874,442, filed on Jul. 15, 2019.

(51) Int. Cl.
*G06F 3/06* (2006.01)
*G06F 1/04* (2006.01)

(52) U.S. Cl.
CPC .............. *G06F 3/0647* (2013.01); *G06F 1/04* (2013.01); *G06F 3/0604* (2013.01); *G06F 3/0659* (2013.01); *G06F 3/0673* (2013.01)

(58) Field of Classification Search
CPC ........ G06F 3/0647; G06F 1/04; G06F 3/0673; G06F 3/0659; G06F 3/0604; G06F 1/12
(Continued)

(56) References Cited

U.S. PATENT DOCUMENTS 5,931,926 A     8/1999   Yeung et al.
6,134,638 A * 10/2000   Olarig ................. G06F 13/1694
                                                                      710/60

(Continued)

FOREIGN PATENT DOCUMENTS

EP          0897154 A2     2/1999

OTHER PUBLICATIONS

ISA/KR, International Search Report and Written Opinion of the International Searching Authority, Int'l Appl. No. PCT/US2020/041053, dated Oct. 15, 2020, Koran Intellectual Property Office, Seo-gu, Daejeon, Republic of Korea, 11 pgs.

*Primary Examiner* — Hong C Kim
(74) *Attorney, Agent, or Firm* — Holland & Hart LLP

(57) ABSTRACT

Methods, systems, and devices for one or more clock domain crossing queues are described. A queue can receive, from a first clock domain, a first command to store data in the queue. The queue can store the data at a first location indicated by a first pointer. The queue can receive, from the first clock domain, a second command to cause the second clock domain to retrieve the data from the queue. The queue can generate, based on receiving the second command, a third command synchronized with a clock of the second clock domain and to cause the second clock domain to retrieve the data. The queue can retrieve the data from the first location in the queue indicated by a second pointer associated with retrieving data based at least in part on generating the third command. The queue can transmit, to the second clock domain, the data.

19 Claims, 7 Drawing Sheets

(58) Field of Classification Search
USPC ..... 711/167, 154; 710/52, 57, 310; 713/320, 713/500
See application file for complete search history.

(56) References Cited

U.S. PATENT DOCUMENTS

| | | |
|---|---|---|
| 2008/0195774 A1 | 8/2008 | Lemke et al. |
| 2011/0213944 A1 | 9/2011 | Guarnaccia et al. |
| 2013/0121100 A1 | 5/2013 | Deivasigamani |
| 2014/0201398 A1* | 7/2014 | Agrawal .................. G06F 1/04 710/57 |
| 2021/0326108 A1* | 10/2021 | Lewis ....................... G06F 5/12 |

* cited by examiner

TRANSFERRING DATA BETWEEN CLOCK DOMAINS USING PULSES ACROSS A QUEUE

CROSS REFERENCE

The present Application for Patent claims the benefit of U.S. Provisional Patent Application No. 62/874,442 by CHEN et al., entitled "CLOCK DOMAIN CROSSING QUEUE," filed Jul. 15, 2019, which is assigned to the assignee hereof, and which is expressly incorporated by reference herein.

TECHNICAL FIELD

The following relates generally to a memory sub-system and more specifically to a clock domain crossing queue for a memory sub-system.

BACKGROUND

A memory sub-system can be a storage device, a memory module, and a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

DETAILED DESCRIPTION

Aspects of the present disclosure are directed to a clock domain crossing queue. A memory sub-system can be a storage device, a memory module, or a hybrid of a storage device and memory module. Examples of storage devices and memory modules are described with reference to FIG. 1. In general, a host system can utilize a memory sub-system that includes one or more memory components. The host system can provide data to be stored at the memory sub-system and can request data to be retrieved from the memory sub-system.

Some systems, including memory sub-systems, can encounter a need to transfer information from one clock domain to another clock domain. Some systems can use an asynchronous first-in first-out (FIFO) circuitry to handle information transferring crossing two different clock domains. A drawback of asynchronous FIFO solutions can be consumption of resources, such as using many gates count and consuming power. Some systems can be more constrained on gate count, power consumption or both.

Aspects of the present disclosure address the above and other deficiencies by having a memory sub-system that includes a queue that transfers data from a first clock domain to a second clock domain. The queue can include two or more locations for storing information. The queue, or other associated circuitry, can maintain two indicators to manage pointers associated with storing and retrieving data to and from the queue and to manage the operations of storing and retrieving to and from the queue. A first indicator can indicate whether the locations of the queue are empty of data from the first clock domain. A second indicator can indicator whether the locations of the queue are full of data from the second clock domain. The queue is configured to reduce a quantity of gates used and reduce an amount of power consumed as compared to other queue designs, such as asynchronous FIFO designs.

Features of the disclosure are initially described in the context of a computing environment as described with reference to FIG. 1. Features of the disclosure are described in the context systems and timing diagrams as described with reference to FIGS. 2A, 2B, 3, and 4. These and other features of the disclosure are further illustrated by and described with reference to an apparatus diagram, a computer system, and flowcharts that relate to clock domain crossing queue as described with references to FIGS. 5-8.

Figure 1:
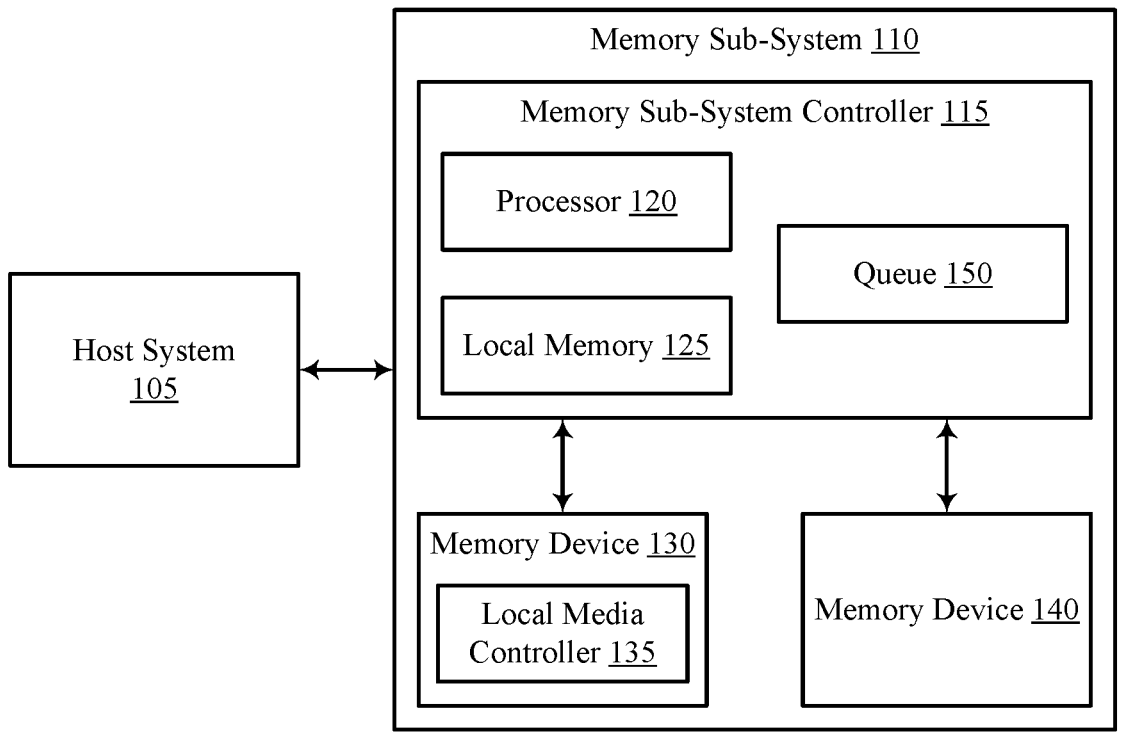
FIG. 1 illustrates an example of a computing environment that supports a clock domain crossing queue in accordance with examples as disclosed herein.

FIG. 1 illustrates an example of a computing environment 100 in accordance with examples as disclosed herein. The computing environment can include a host system 105 and a memory sub-system 110. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 105 that is coupled with a memory system. The memory system can be one or more memory sub-systems 110. In some examples, the host system 105 is coupled with different types of memory sub-systems 110. FIG. 1 illustrates one example of a host system 105 coupled with one memory sub-system 110. The host system 105 uses the memory sub-system 110, for example, to write data to the memory sub-system 110 and read data from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can be a computing device such as a desktop computer, laptop computer, network server, mobile device, a vehicle (e.g., airplane, drone, train, automobile, or other conveyance), embedded systems, Internet of Things (IoT) devices, or such computing device that includes a memory and a processing device. The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 105 and the memory sub-system 110. The host system 105 can further utilize an NVM Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a three-dimensional (3D) cross-point ("3D cross-point") type flash memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

In some embodiments, each of the memory devices 130 can include one or more arrays of memory cells such as single level cells (SLCs), multi-level cells (MLCs), triple level cells (TLCs), quad-level cells (QLCs), or a combination of such. In some examples, a particular memory component can include an SLC portion, and an MLC portion, a TLC portion, or a QLC portion of memory cells. Each of the memory cells can store one or more bits of data used by the host system 105. Furthermore, the memory cells of the memory devices 130 can be grouped as memory pages or memory blocks that can refer to a unit of the memory component used to store data.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 cannot include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA)) and a physical address that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the media device 130 (e.g., perform media management operations on the media device 130). In some embodiments, the memory devices 130 can be locally managed memory devices, which is a raw memory device combined with a local media controller 135 that performs memory management operations on the memory device 130 within the same memory device package.

The memory sub-system 110 includes a queue 150 that can synchronize signals across disparate clock domains. In some examples, the memory sub-system controller 115 includes at least a portion of the queue 150. For example, the memory sub-system controller 115 can include a processor 120 (e.g., a processing device) configured to execute instructions stored in local memory 125 for performing the operations described herein. In some examples, the queue 150 is part of the host system 105, an application, or an operating system.

Components of the memory sub-system 110 can operate in different clock domains. For example, a first component can operate in a first clock domain having a clock with a first periodicity (e.g., 1 MHz) and a second component can operate in a second clock domain having a clock with a second periodicity (e.g., 2 MHz). The queue 150 can be uni-directional translator from the first clock domain (e.g., the source component) to the second clock domain (e.g., the destination component) thereby enabling the first component and the second component to communicate with each other. In some cases, the queue 150 can be a bi-directional translator. In some cases, a bi-directional translator can include two or more uni-directional translators.

Figure 2A:
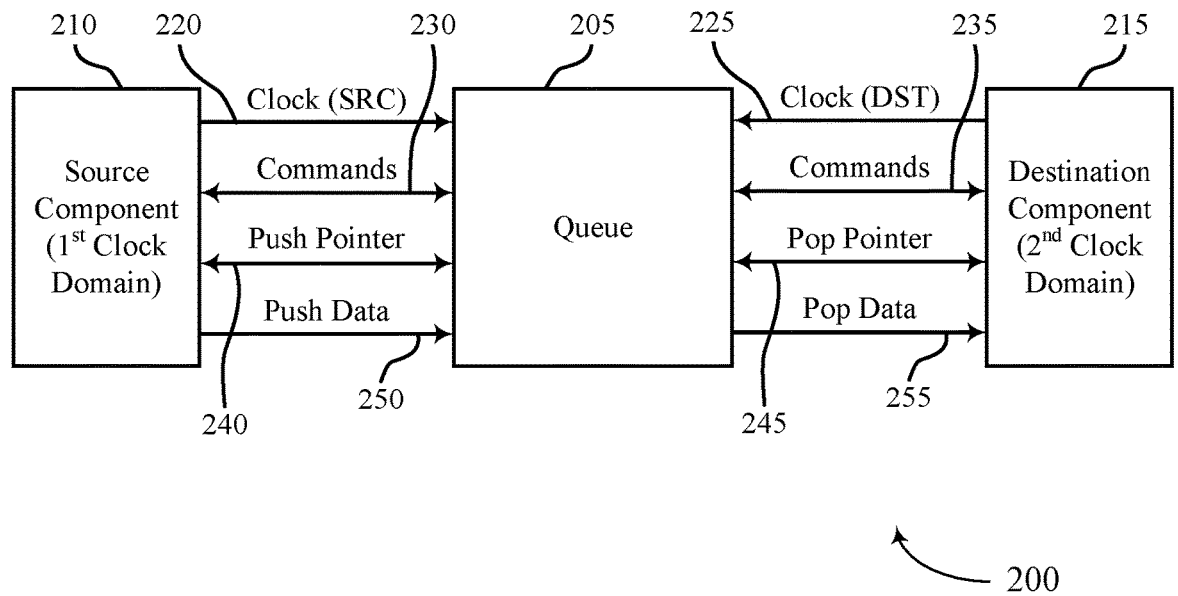
FIG. 2A illustrates an example of a system that supports a clock domain crossing queue in accordance with examples as disclosed herein.

FIG. 2A illustrates an example of a system 200 that supports a clock domain crossing queue in accordance with examples as disclosed herein. The system 200 includes a queue 205 configured to translate information between different clock domains. For example, the queue 205 can be coupled with a source component 210 using a first clock domain and a destination component 215 using a second clock domain different than the first clock domain. The queue 205 can be configured to translate data and commands between the first clock domain and the second domain. The illustrative example of the queue 205 illustrates data being translated from the first clock domain to the second clock domain. The principles and features described herein can also be used to translate data from the second clock domain to the first clock domain.

Many systems can encounter a need to transfer information from one clock domain to another clock domain. Some systems can use, for example, an asynchronous FIFO circuitry to handle information transferring crossing two different clock domains. A depth of the asynchronous FIFO circuitry can be based on a throughput requirement, a source-destination clock frequency ratio, or a combination thereof. A drawback of asynchronous FIFO solutions can be consumption of resources, such as using many gates count and consuming power.

Some systems can be more constrained on gate count, power consumption, or both. In addition, for some systems, it cannot be required that every single piece of information transmitted by the first clock domain be received by the second clock domain. Rather, the results can be achieved even with some data loss. For example, the source component 210 (using the first clock domain) can be configured to transfer some counter values to the destination component 215 (using the second clock domain). The destination component 215 can avoid needing to receive every single counter value transmitted by the source component 210 to accomplish the desired results. Rather, the destination component 215 can achieve the results receiving a subset of the transmitted counter values.

Techniques are described herein for the queue 205 that transfers data from a first clock domain to a second clock domain. The queue 205 can include two or more locations for storing information. The queue, or other associated circuitry, can maintain one or more (e.g., two) indicators to manage a push pointer and a pop pointer. A first indicator can indicate whether the locations of the queue 205 are empty of (e.g., do not include) data from the first clock domain. A second indicator can indicate whether the locations of the queue 205 are full of (e.g., include) data from the second clock domain. The queue 205 can be configured to reduce a quantity of gates used and reduce an amount of power consumed as compared to other queue designs, such as asynchronous FIFO designs.

The queue 205 can be configured to perform clock domain crossing and to use minimum space for information storage. To achieve clock domain crossing, the source component 210 can store data (e.g., push data) on a storage component of the queue 205 at a location indicated by a push pointer and the destination component 215 can retrieve data (e.g., pop data) on the storage component of the queue 205 at a location indicated by a pop pointer. The push pointer and the pop pointer can be, in some examples, independently configurable.

The system 200 illustrates a design for the queue 205, the source component 210, and the destination component 215 and various data exchanged between the various entities. The information described herein can be communicated over one or more channels. The connections in the block diagram illustrating the system 200 should not be considered limiting.

The source component 210 can transmit its clock 220 to the queue 205 and the destination component 215 can transmit its clock 225 to the queue 205. The clock 220 and the clock 225 can operate at different frequencies. If the frequency of the clock 220 matched the frequency of the clock 225, the queue 205 cannot be used, in some implementations. The queue 205 can be configured to translate data between any mismatch of frequencies of the clocks 220 and 225. For example, the first clock 220 can have a higher frequency than the second clock 225 or the first clock 220 can have a lower frequency than the second clock 225. In some cases, the first clock 220 and/or the second clock 225 can refer to clock signals received from other sources. In other cases, the first clock 220 and/or the second clock 225 can refer to hardware components that generate clock signals.

The source component 210 can exchange commands 230 with the queue 205. Examples of the commands 230 exchanged between the two components can include a push command, a pop_src command, a notification, or a combination thereof. Additional features about these exemplary commands are described in more detail with reference to FIGS. 3 and 4.

The destination component 215 can exchange commands 235 with the queue 205. Examples of the commands 235 exchanged between the two components can include a pop_dst command, a notification, or a combination thereof. Additional features about these exemplary commands are described in more detail with reference to FIGS. 3 and 4.

The source component 210 can exchange information about a push pointer 240 with the queue 205 and the destination component 215 can exchange information about a pop pointer 245 with the queue 205. In some implementations, the source component 210 and the destination component 215 can maintain and/or move their respective pointers (e.g., the push pointer 240 and the pop pointer 245). In such implementations, the source component 210 and the destination component 215 transmit information about the pointers to the queue 205. In other implementations, the queue 205 can maintain and/or the push pointer 240 and the pop pointer 245. In such implementations, the queue 205 can transmit information about the pointers to the source component 210 or the destination component 215 or combinations thereof. Additional features about the push pointer 240 and the pop pointer 245 are described in more detail with reference to FIGS. 3 and 4.

The source component 210 can transmit push data 250 to the queue 205, which can be stored in a location of the storage component of the queue 205. Examples of the push data 250 can include counter values or other data to be transferred from the first clock domain of the source component 210 and the second clock domain of the destination component 215. Additional features about the push data 250 is described in more detail with reference to FIGS. 3 and 4.

The destination component 215 can retrieve pop data 255 from the queue 205, which can be stored in a location of the storage component of the queue 205. Examples of the pop data 255 can include counter values or other data to be transferred from the first clock domain of the source component 210 and the second clock domain of the destination component 215. Additional features about the pop data 255 is described in more detail with reference to FIGS. 3 and 4.

In some cases, the queue 205 can include two locations to store data from the source component 210. In other cases, the queue 205 can include more than two locations to store data (e.g., three, four, five, six, seven, eight, etc.). Functions of the queue 205 are described with reference to a queue that includes two locations for storing data. The features described herein can be extended to be used with queues that include more than two locations. In some cases, the storage component of the queue 205 includes memory cells formed of chalcogenide materials, such as PCM or self-selecting memory. In other cases, the storage component of the queue 205 can include memory cells that use dynamic random access (DRAM) memory technology, ferroelectric random access (FeRAM) memory technology, not-AND (NAND) flash memory technology, other memory technologies, or combinations thereof.

Figure 2B:
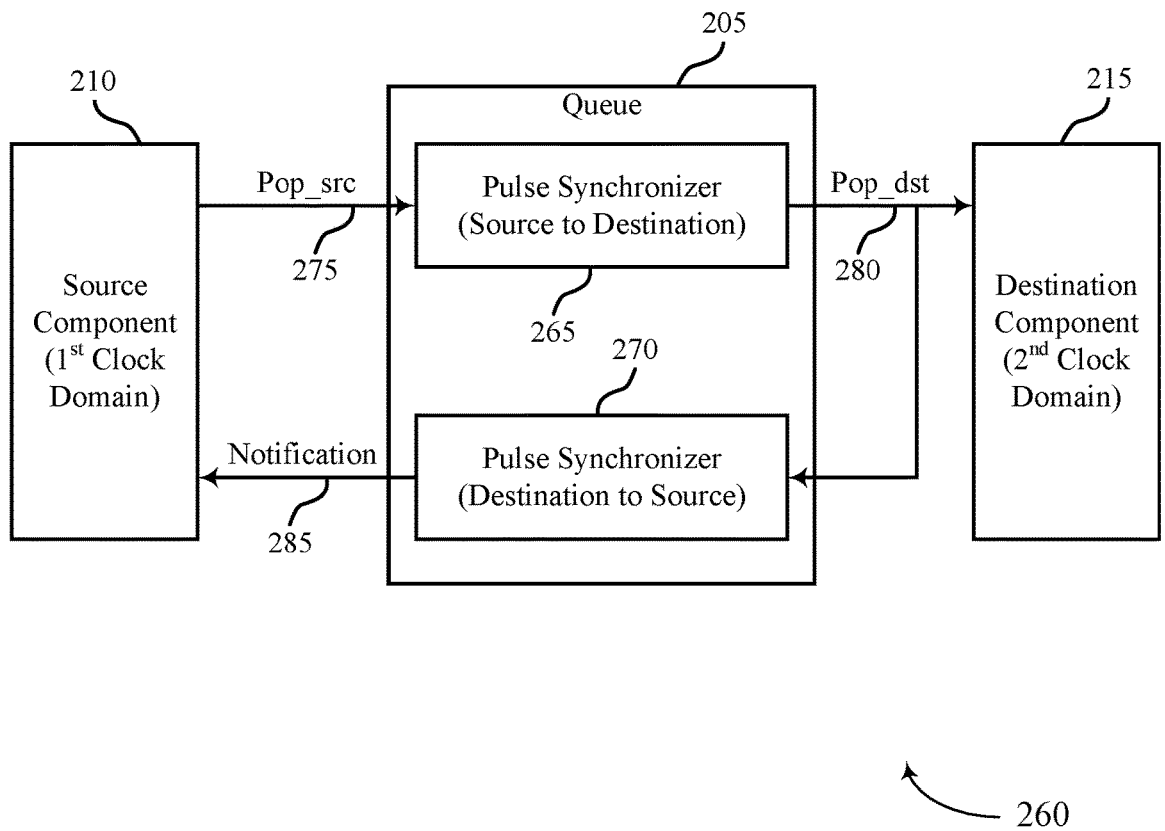
FIG. 2B illustrates an example of a system that supports a clock domain crossing queue in accordance with examples as disclosed herein.

FIG. 2B illustrates an example of a system 260 that supports a clock domain crossing queue in accordance with examples as disclosed herein. The system 260 illustrates additional features about the queue 205 and an implementation of at least some commands associated with the queue 205.

The queue 205 can include a first pulse synchronizer 265 and a second pulse synchronizer 270. The first pulse synchronizer 265 can be configured to synchronize a signal from the first clock domain of the source component 210 to the second clock domain of the destination component 215. The second pulse synchronizer 270 can be configured to synchronize a signal from the second clock domain of the destination component 215 to the first clock domain of the source component 210. The pulse synchronizers 265 and 270 can include one or more flip flops or other circuitry to synchronize signal across asynchronous clock domains. The queue 205 can include any quantity of first pulse synchronizers 265 or any quantity of second pulse synchronizers 270.

The system 260 illustrates an example implementation a synchronization process for a pop signal. The source component 210 can transmit a pop_src command 275 to the queue 205. The pop_src command 275 can indicate to the queue 205, and by extension to the destination component 215, that data should be retrieved (e.g., popped) from the queue by the destination component 215. The first pulse synchronizer 265 can generate a pop_dst command 280 can processing the pop_src command 275. In some cases, the queue 205 can automatically generate the pop_dst command 280 based on receiving the pop_src command 275. The queue 205 can transmit the pop_dst command 280 to the destination component 215. The pop_dst command 280 can be configured to cause the destination component 215 to retrieve data from the storage component of the queue 205 at a location indicated by the pop pointer.

The queue 205 can feed the pop_dst command 280 through the second pulse synchronizer 270 to generate the notification 285. The notification 285 can be configured to indicate to the source component 210 that data has been retrieved (e.g., popped) from the queue 205. Once data has been popped from the queue 205, the source component 210 can determine that an additional location of the storage component of the queue is available for storing data. In some cases, the source component 210 can update a push pointer or one or more indicators based on receiving the notification 285.

In some cases, the queue 205 can automatically generate the notification 285 based on transmitting the pop_dst command 280. In such cases, retrieving the data from the storage component of the queue 205 by the destination component 215 can take less than time (or an equal amount of time) as generating the notification 285 and transmitting the notification 285 to the source component 210 by the queue 205. Additional details about the synchronization process for the pop signal are described in more detail with reference to FIGS. 3 and 4.

Figure 3:
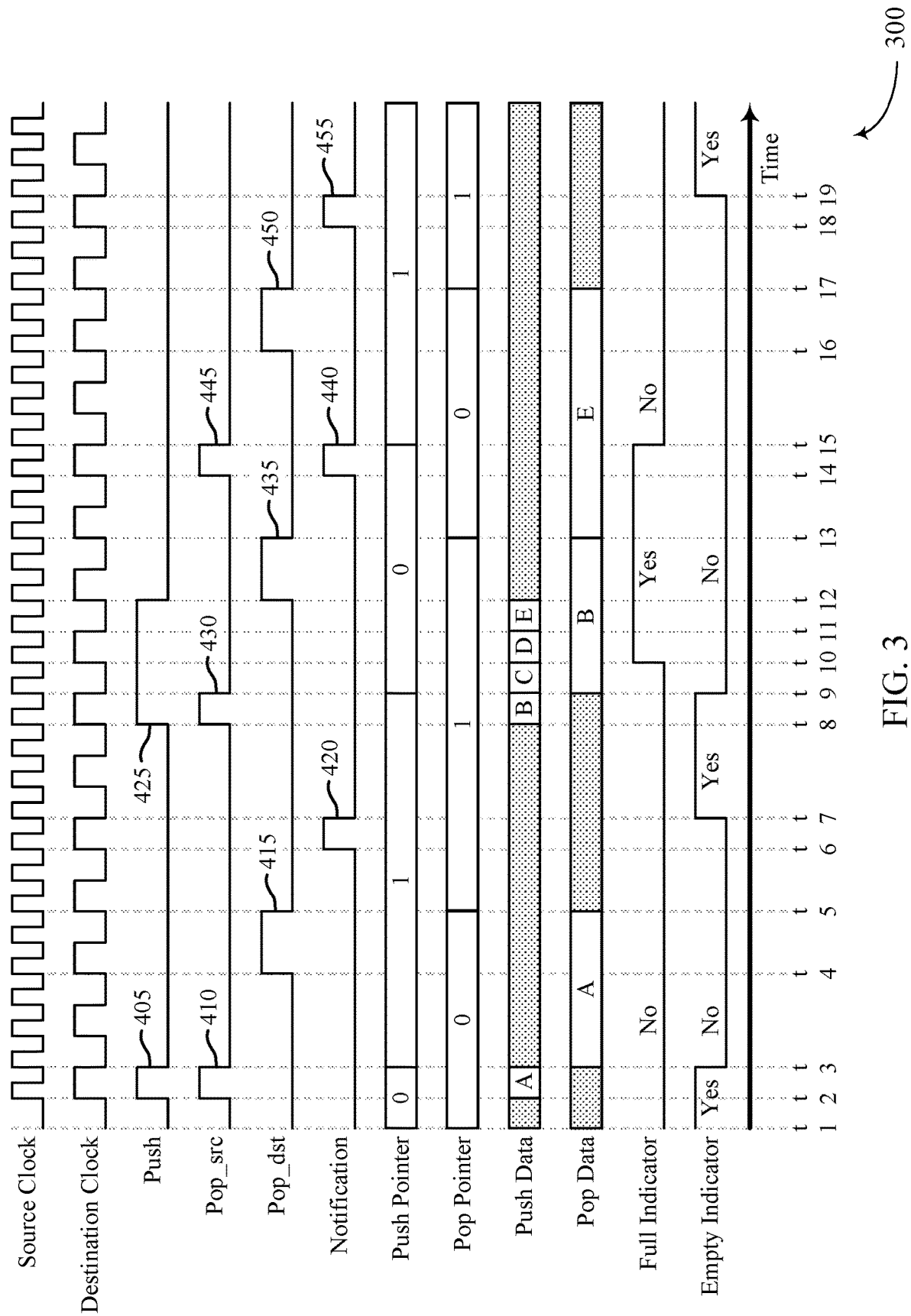
FIG. 3 illustrates an example of a timing diagram that supports a clock domain crossing queue in accordance with examples as disclosed herein.

FIG. 3 illustrates an example of a timing diagram 300 that supports a clock domain crossing queue in accordance with examples as disclosed herein. The timing diagram 300 can illustrate one or more accesses of a queue (e.g., the queue 205 described with reference to FIGS. 1, 2A, and 2B). The operations illustrated by the timing diagram 300 are for a queue that includes two locations for storing data in a storage component. In other examples, the queue can include more than two locations for storing data.

At time t1, the queue is initially empty, meaning that data is not stored in any location of the storage component of the queue. In some examples, a storage component of the queue may include or may refer to one or more memory cells formed of chalcogenide materials, such as PCM or self-selecting memory. In other cases, a storage component of the queue can include memory cells that use dynamic random access (DRAM) memory technology, ferroelectric random access (FeRAM) memory technology, not-AND (NAND) flash memory technology, other memory technologies, or combinations thereof. The timing diagram shows that the source clock (e.g., clock 220) can be operating a first frequency that is roughly twice the second frequency of the destination clock (e.g., clock 225). In other examples, the destination clock can be operating at a higher frequency than the source clock. Other frequency ratios of the source clock and the destination clock are included in this disclosure. At this initialized state, the push pointer can be pointing at a first location (e.g., location 0) and the pop point can be pointing at a first location (e.g., location 0) of the storage component of the queue.

In addition, at this initialized state, a full indicator can indicate that that queue is not full and the empty indicator can indicate that the queue is empty. The full indicator can be configured to indicate whether every location of the storage component of the queue is storing information from the source component. Said another way, the full indicator can be configured to indicate whether at least one location is available to store additional information from the source component. In the illustrative example, a zero value of the full indicator indicates that the queue is not full (e.g., at least one location is available to receive information from the source component) and a one value of the full indicator indicates that the queue is full (e.g., all locations of the queue are currently storing information). In other implementations, the meanings of the zero value and the one value of the full indicator can be reversed.

The empty indicator can be configured to indicate whether every location of the storage component of the queue is available for storing information from the source component. Said another way, the empty indicator can be configured to indicate whether at least one location is storing information received from the source component. In the first illustrative example, a zero value of the empty indicator indicates that the queue is not empty (e.g., at least one location is storing information from the source component) and a one value of the empty indicator indicates that the queue is empty (e.g., all locations of the queue are available for receiving and storing information associated with the source component). In other implementations, the meanings of the zero value and the one value of the empty indicator can be reversed.

The system can use the full indicator and the empty indicator to manage the locations of the push pointer and pop pointer during access operation. For example, the full indicator can be used to indicate whether push pointer should be moved after a push command is received and the empty indicator can be used to indicate whether a pop command should be issued immediately after a pop operation is complete. In some cases, the queue can maintain the full indicator and the empty indicator. In some cases, the source component can maintain the full indicator and the empty indicator.

At time t2, the source component (e.g., source component 210) can issue a push command, as indicated by pulse 405, that is received by the queue. The source component can also transmit the push data, as indicated by the push data "A" of the timing diagram 300. The queue can identify the location indicated by the push pointer (e.g., the first location, location 0) and can store the push data "A" in the location indicated by the push pointer.

At time t2, the source component can also issue a pop_src command, as indicated by pulse 410, that is received by the queue. The source component can concurrently issue the pop_src command with the push command because the source component can know that every time data is pushed onto the queue, that same data should be popped from the queue. In some cases, the source component can determine whether other data is being popped currently from the queue. In such cases, the source component can issue a push command without issuing a pop_src command (e.g., as shown in t9-t12).

At time t3, at or after the conclusion of the pulses 405 and/or 410, pointers and indicators can be updated and the queue can begin generating the pop_dst command. First, the conditions for both the full indicator and the empty indicator can be identified and the indicators updated accordingly, by either the queue, the source component, or a combination thereof. In this case, the value of the empty indicator is modified because at least one location of the queue is storing data from the source component (in this illustrative example exactly one location is storing information). In this case, the value of the full indicator is not modified because at least one location of the queue is still available for storing additional information from the source component (in this illustrative example exactly one location is available to store additional information).

Second, the push pointer can be updated (e.g., by the queue, the source component, or a combination thereof) based on the value of the full indicator, after the indicators were updated. In this example, the full indicator is a zero value and the full indicator is a zero value. This condition of the indicators can indicate that the second location of the queue is available to receive additional information from the source component. The queue (or the source component) can modify the push pointer to point to the second location (e.g., location 1) of the queue.

Third, the queue can begin generating the pop_dst command using the synchronization process described with reference to FIG. 2B. The pulse synchronizer can take a first duration between t3 and t4 to change the synchronization of the pop_src command from the first clock domain of the source component to the second clock domain of the destination component.

At time t4, the queue can transmit the pop_dst command to the destination component, as indicated by pulse 415. Between times t4 to t5 the destination component can retrieve the data stored at the location (e.g., the first location, location 0) indicated by the pop pointer.

At time t5, the pop pointer can be updated (e.g., by the queue, the source component, destination component, or a combination thereof) based on retrieving the data from the queue. The queue (or the destination component) can modify the pop pointer to point to the second location (e.g., location 1) of the queue.

In addition, at time t5, the queue can begin generating the notification using the synchronization process described with reference to FIG. 2B. The pulse synchronizer can take a second duration between times t5 and t6 to change the synchronization of the pop_dst command from the second clock domain of the destination component to the first clock domain of the source component. The second duration used by the destination-to-source pulse synchronizer can be a different length (e.g., shorter) than the first duration used by the source-to-destination pulse synchronizer because of the type of clock mismatch. For example, because the source clock is faster than the destination clock, the second duration can be faster than the first destination.

At time t6, the queue can transmit the notification, as indicated by pulse 420, to the source component. The source component can check the status of the indicators to determine whether another pop_src command should be issued. Because the full indicator and/or the empty indicator indicate that the pop command (which was just executed) emptied out the queue, the source component cannot issue a pop_src command immediately. This is in contrast to the pop_src command issued at time t14 in a different situation described herein.

At time t7, the conditions for both the full indicator and the empty indicator can be identified and the indicators updated accordingly, by either the queue, the source component, or a combination thereof. In this case, the value of the empty indicator is modified because no locations of the queue are actively storing data of the source component any longer.

At time t8, the source component issues another push command, as indicated by pulse 425, and another pop_src command, as indicated by pulse 430. Before these commands are issued, both locations of the queue are available for storing information. One difference between the push command of pulse 425 from the push command of pulse 405 is that the push command of pulse 425 is extended to store data in the queue. In this situation, the quantity of push commands and/or push data will exceed the quantity of locations in the queue (e.g., two locations). Techniques for managing push operations and push pointers in such situations are described.

First, the push data "B" is stored at the second location (e.g., location 1) indicated by the push pointer based on receiving the push command at time t8. Second, the synchronization process for the pop_src command indicated by pulse 430 is started at time t8. The synchronization process for pop commands and procedures for updating pointers and indicators are described more fully with reference to FIG. 2B and times t1 through t7 of FIG. 3. As such, details about the synchronization process of pop commands, details about updating indicators, and details about updating pointers are not fully described here.

At time t9, the indicators (e.g., the full indicator and the empty indicator) are updated and the push pointer is updated based on the indicators. In this specific example, the empty indicator is updated from a one value (indicating that the queue is empty) to a zero value (indicating that at least one location of the queue is storing information). In this specific example, the push pointer is updated from second location (e.g., location 1) to the first location (e.g., location 0) of the queue.

Also, at time t9, the push command as indicated by the pulse 425 remains high and the push data "C" is transmitted by the source component to the queue. The queue can store the push data "C" at the first location (e.g., location 0) as indicated by the push pointer.

At time t10, the indicators (e.g., the full indicator and the empty indicator) are updated and the push pointer is updated based on the indicators. In this specific example, the full indicator is updated from a zero value (indicating that at least one location is available for storing information) to a one value (indicating that the queue is full). In this specific example, the push pointer is kept at its same value (e.g., location 0) because the full indicator indicates that there are no additional locations of the queue to receive and store information from the source component.

In addition, at time t10, the queue is processing the pop_src command indicated by pulse 430 to cause the destination component to retrieve the data "B") stored at the second location as indicated by the pop pointer. In some cases, it takes more time for the destination component to retrieve data than it does for the source component to store data at the queue. In such cases, the amount of push data received can overwhelm the quantity of locations of the queue and techniques can be implemented to manage such cases. As described more fully herein, in such cases, the push pointer can be left in place and the data in that location of the queue can be overwritten until a new location becomes available for storing data.

Also, at time t10, the push command as indicated by pulse 425 remains high and the push data "D" is transmitted by the source component to the queue. The queue can store the push data "D" at the first location (e.g., location 0) as indicated by the push pointer. This storing of data "D" at the first location can overwrite the data "C" stored at location at time t9.

At time t11, the indicators (e.g., the full indicator and the empty indicator) are updated and the push pointer is updated based on the push command at time t10. In this specific example, the full indicator and the empty indicator are not modified because the queue remains full. In this specific example, the push pointer is kept at its same value (e.g., location 0) because the full indicator indicates that there are no additional locations of the queue to receive and store information from the source component.

Also, at time t11, the push command as indicated by the pulse 425 remains high and the push data "E" is transmitted by the source component to the queue. The queue can store the push data "E" at the first location (e.g., location 0) as indicated by the push pointer. This storing of data "E" at the first location can overwrite the data "D" stored at location at time t10.

At time t12, the indicators (e.g., the full indicator and the empty indicator) are updated and the push pointer is updated based on the push command at time t11. In this specific example, the full indicator and the empty indicator are not modified because the queue remains full. In this specific example, the push pointer is kept at its same value (e.g., location 0) because the full indicator indicates that there are no additional locations of the queue to receive and store information from the source component. At time t12, the push command as indicated by the pulse 425 also goes low.

Incidentally, also at time t12, the queue can transmit the pop_dst command to the destination component, as indicated by pulse 435. Between times t12 to t13 the destination component can retrieve the data "B" stored at the location (e.g., the second location, location 1) indicated by the pop pointer.

At time t13, the pop pointer can be updated (e.g., by the queue, the source component, destination component, or a combination thereof) based on retrieving the data from the queue. The queue (or the destination component) can modify the push pointer to point to the first location (e.g., location 0) of the queue.

At time t14, the queue can transmit the notification, as indicated by pulse 440, to the source component. The source component can check the status of the indicators to determine whether another pop_src command should be issued. Because the empty indicator indicates that the pop command (which as just executed) did not empty out the queue (e.g., at least one location still stores information), the source component can issue a pop_src command immediately as indicated by the pulse 445. In some cases, circuitry or logic can be used to gate the notification to the pop_src command based on the value empty indicator, or the value of the full indicator, or a combination thereof. The pop_src command indicated by the pulse 445 can be issued concurrently (e.g., at the same time) as the notification. Such immediate issuing of the pop command can ensure the speed of operation of the queue.

At time t15, the conditions for both the full indicator and the empty indicator can be identified and the indicators updated accordingly, by either the queue, the source component, or a combination thereof. In this case, the value of the full indicator is modified because at least one location of the queue is available to store new information from the source command. The value of the empty indicator is not modified because at least one location of the queue is actively storing information of the source component.

Also, at time t15, the push pointer is updated from the first location (e.g., location 0) to the second location (e.g., location 1). In some examples, this can be in response to the notification that the pop command has been executed and that the second location is now available for storing new information. In some examples, this can be in response to updating the full indicator to indicate that at least one location is available for storing information.

The remainder of the timing diagram 300 illustrates a pop operation to retrieve the data "E" stored at the first location (e.g., location 0) of the queue. At time t16, the queue can transmit the pop_dst command to the destination component, as indicated by pulse 450. Between times t16 to t17 the destination component can retrieve the data "E" stored at the location (e.g., the first location, location 0) indicated by the pop pointer. At time t17, the pop pointer is updated. At time t18, the queue can transmit the notification, as indicated by pulse 455, to the source component. The source component can check the status of the indicators to determine whether another pop_src command should be issued. Because the empty indicator indicates that the pop command (which was just executed) emptied out the queue, the source component cannot issue a pop_src command immediately. At time t19, the empty indicator can be updated to indicate that every location of the queue is available to store information.

The timing diagram 300 illustrates operations for a queue that includes two locations (e.g., a queue having a depth of two). In such cases, the empty indicator and the full indicator can be used by to update pointers and indicators. For example, if the values of the full indicator and the empty indicator are 0 and 1, it can indicate that zero locations are storing information; if the values of the full indicator and the empty indicator are 0 and 0, it can indicate that one location is storing information; and if the values of the full indicator and the empty indicator are 1 and 0, it can indicate that two locations (e.g., all) are storing information. In such examples, the indicators themselves can be used to determine how update pointers and indicators.

In some cases, a queue can have more than two locations (e.g., a queue having a depth of three or more). In such cases, the empty indicator and the full indicator as described herein cannot be able to be used exclusively to update pointers and indicators. For example, if the values of the full indicator and the empty indicator are 0 and 0 for a three location queue, it can indicate that one location or two locations are storing information.

More information can be needed to determine how to update the indicators after a push command or pop command. In some implementations, additional indicators can be added to indicate the larger quantity of possible states, additional bits can be added to either the full indicator or the empty counter or both to indicate the larger quantity of possible states, or the queue (or source component) can be configured to examine additional information to know how to update indicators and/or pointers in a queue with three or more locations. For example, the queue or source component can analyze the locations themselves to determine whether the locations are storing information. In other examples, the queue or source component can analyze a register of indicators that indicate whether a given location is storing information.

Figure 4:
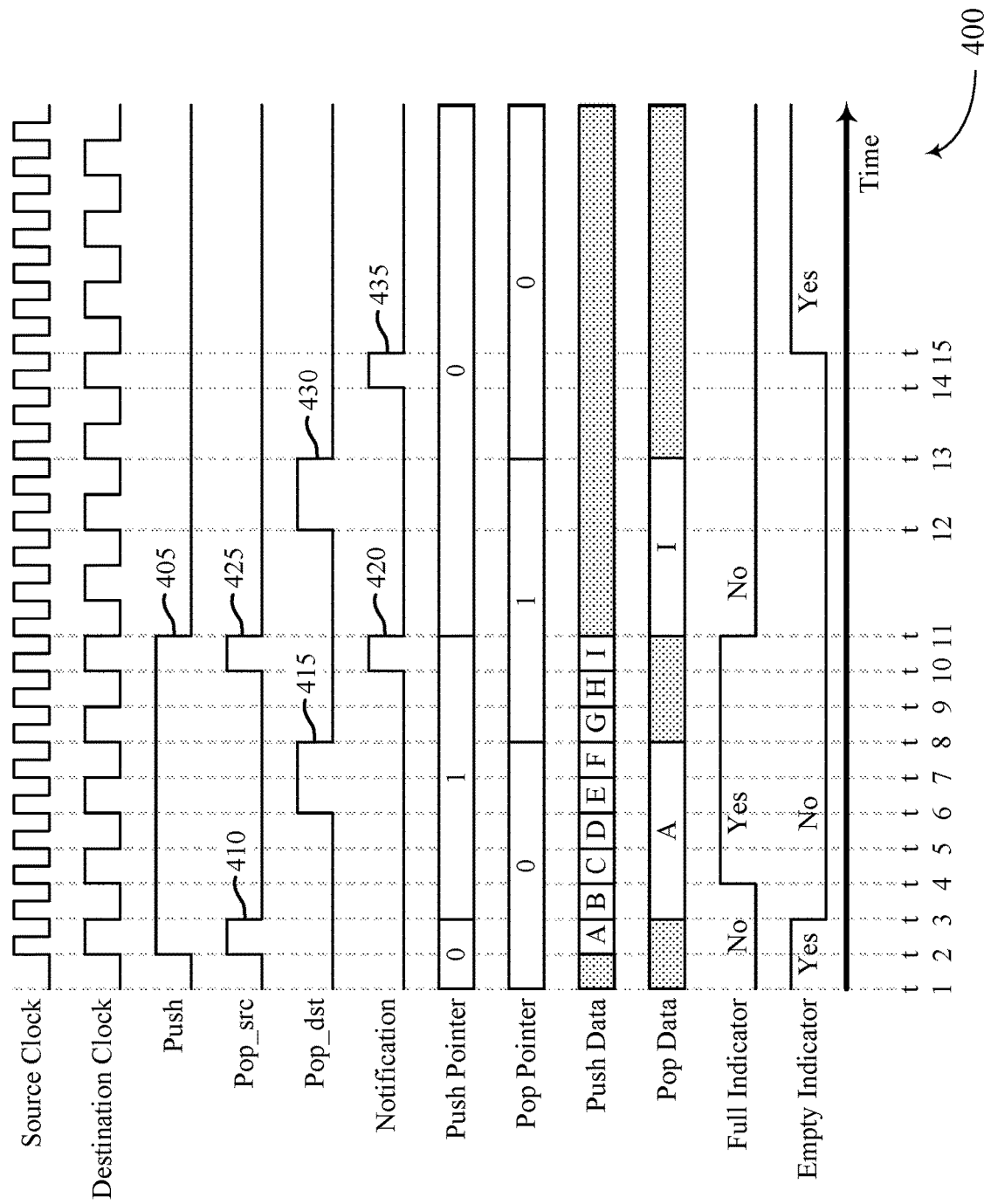
FIG. 4 illustrates an example of a timing diagram that supports a clock domain crossing queue in accordance with examples as disclosed herein.

FIG. 4 illustrates an example of a timing diagram 400 that supports a clock domain crossing queue in accordance with examples as disclosed herein. The timing diagram 400 can illustrate one or more accesses of a queue (e.g., the queue 205 described with reference to FIGS. 1, 2A, and 2B). The operations illustrated by the timing diagram 400 are for a queue that includes two locations for storing data in a storage component. In other examples, the queue can include more than two locations for storing data.

The timing diagram 400 illustrates an additional scenario not illustrated in timing diagram 300. The timing diagram 400 implements features, functions, operations, and communications of the timing diagram 300. The timing diagram 400 incorporates by reference the description of the timing diagram 300 described with reference to FIG. 3. As such, features, functions, operations, and communications cannot be fully described in the timing diagram 400. More information about features, functions, operations, and communications illustrated in the timing diagram 400 are described with reference to FIG. 3.

The timing diagram 400 illustrates an example of overwriting data stored at a location of the queue based on the queue being full. The features of the timing diagram 400 are similar to the features of times t8 through t19 described with reference to FIG. 3. In some cases, the queue can be configured to overwrite some data because translating every piece of information or data cannot be critical. Rather, the queue can be configured to reduce the area of the layout (e.g., gate count) and/or power consumption of the queue.

At time t1, the queue is initially empty, meaning that data is not stored in any location of the storage component of the queue. The timing diagram shows that the source clock (e.g., clock 220) is operating a first frequency that is roughly twice the second frequency of the destination clock (e.g., clock 225). At this initialized state, the push pointer can be pointing at a first location (e.g., location 0) and the pop point can be pointing at a first location (e.g., location 0) of the storage component of the queue. In addition, at this initialized state, a full indicator can indicate that that queue is not full and the empty indicator can indicate that the queue is empty.

At time t2, the source component issues a push command, as indicated by pulse 405, and a pop_src command, as indicated by pulse 410. Before these commands are issued, both locations of the queue are available for storing information. The push command of pulse 405 is extended to store data in the queue. In this situation, the quantity of push commands and/or push data will exceed the quantity of locations in the queue (e.g., two locations). The push command extends from time t2 to t11 and is associated with the following data pushed by the source component: data "A," data "B," data "C," data "D," data "E," data "F," data "G," data "H," and data "I." Later, data "A" and data "I" are retrieved from the queue by the destination component, while the other data (e.g., data B-H) are lost due to overwriting.

At time t2, the data "A" is stored at the first location (e.g., location 0) indicated by the push pointer. The synchronization process for the pop_src command indicated by pulse 410 is started at time t2. The synchronization process for pop commands and procedures for updating pointers and indicators are described more fully with reference to FIGS. 2B and 3. As such, details about the synchronization process of pop commands, details about updating indicators, and details about updating pointers are not fully described here.

At time t3, the indicators (e.g., the full indicator and the empty indicator) are updated and the push pointer is updated based on the indicators. In this specific example, the empty indicator is updated from a one value (indicating that the queue is empty) to a zero value (indicating that at least one location of the queue is storing information). In this specific example, the push pointer is updated from second location (e.g., location 1) to the first location (e.g., location 0) of the queue.

Also, at time t3, the push command as indicated by the pulse 405 remains high and the push data "B" is transmitted by the source component to the queue. The queue can store the push data "B" at the second location (e.g., location 1) as indicated by the push pointer.

At time t4, the indicators (e.g., the full indicator and the empty indicator) are updated and the push pointer is updated based on the indicators. In this specific example, the full indicator is updated from a zero value (indicating that at least one location of the queue is available for storing information) to a one value (indicating that queue is full). In this specific example, the push pointer is not updated because all of the locations of the queue are storing data.

Also, at time t4, the push command as indicated by the pulse 405 remains high and the push data "C" is transmitted by the source component to the queue. The queue can store the push data "C" at the second location (e.g., location 1) as indicated by the push pointer. This storing of data "C" at the second location can overwrite the data "B" stored at the second location at time t3.

At time t5, the indicators and the pointers are not updated because there is no change in the state of the queue (e.g., the queue remains full). Also, the push command as indicated by the pulse 405 remains high and the push data "D" is transmitted by the source component to the queue. The queue can store the push data "D" at the second location (e.g., location 1) as indicated by the push pointer. This storing of data "D" at the second location can overwrite the data "C" stored at the second location at time t4.

The pattern of overwriting push data at the second location (e.g., location 1) continues at times t6, t7, t8, t9, and t10, until time t11 when the push command indicated by pulse 405 ceases. During this interval, the source component overwrites data in the second location until the data "I" is stored and the process of updating indicators and pointers continues, even though the indicators cannot be modified because of the existing conditions. The remaining portions of the description of the timing diagram 400 focus on the aspects of the timing diagram not related to the push command indicated by pulse 405.

At time t6, the queue can transmit the pop_dst command to the destination component, as indicated by pulse 415. Between times t6 to t8 the destination component can retrieve the data "A" stored at the location (e.g., the first location, location 0) indicated by the pop pointer.

At time t8, the pop pointer can be updated (e.g., by the queue, the source component, destination component, or a combination thereof) based on retrieving the data from the queue. The queue (or the destination component) can modify the pop pointer to point to the second location (e.g., location 1) of the queue.

At time t10, the queue can transmit the notification, as indicated by pulse 420, to the source component. The source component can check the status of the indicators to determine whether another pop_src command should be issued. Because the empty indicator indicates that the pop command (which was just executed) did not empty out the queue (e.g., at least one location still stores information), the source component can issue a pop_src command immediately as indicated by the pulse 425.

At time t11, the conditions for both the full indicator and the empty indicator can be identified and the indicators updated accordingly, by either the queue, the source component, or a combination thereof. In this case, the value of the full indicator is modified because at least one location of the queue is available to store new information from the source command. The value of the empty indicator is not modified because at least one location of the queue is actively storing information of the source component.

The remainder of the timing diagram 400 illustrates a pop operation to retrieve the data "I" stored at the second location (e.g., location 1) of the queue. At time t12, the queue can transmit the pop_dst command to the destination component, as indicated by pulse 430. Between times t12 to t13 the destination component can retrieve the data "I" stored at the location (e.g., the second location, location 1) indicated by the pop pointer. At time t13, the pop pointer is updated. At time t14, the queue can transmit the notification, as indicated by pulse 435, to the source component. The source component can check the status of the indicators to determine whether another pop_src command should be issued. Because the empty indicator indicates that the pop command (which was just executed) emptied out the queue, the source component cannot issue a pop_src command immediately. At time t15, the empty indicator can be updated to indicate that every location of the queue is available to store information.

Figure 5:
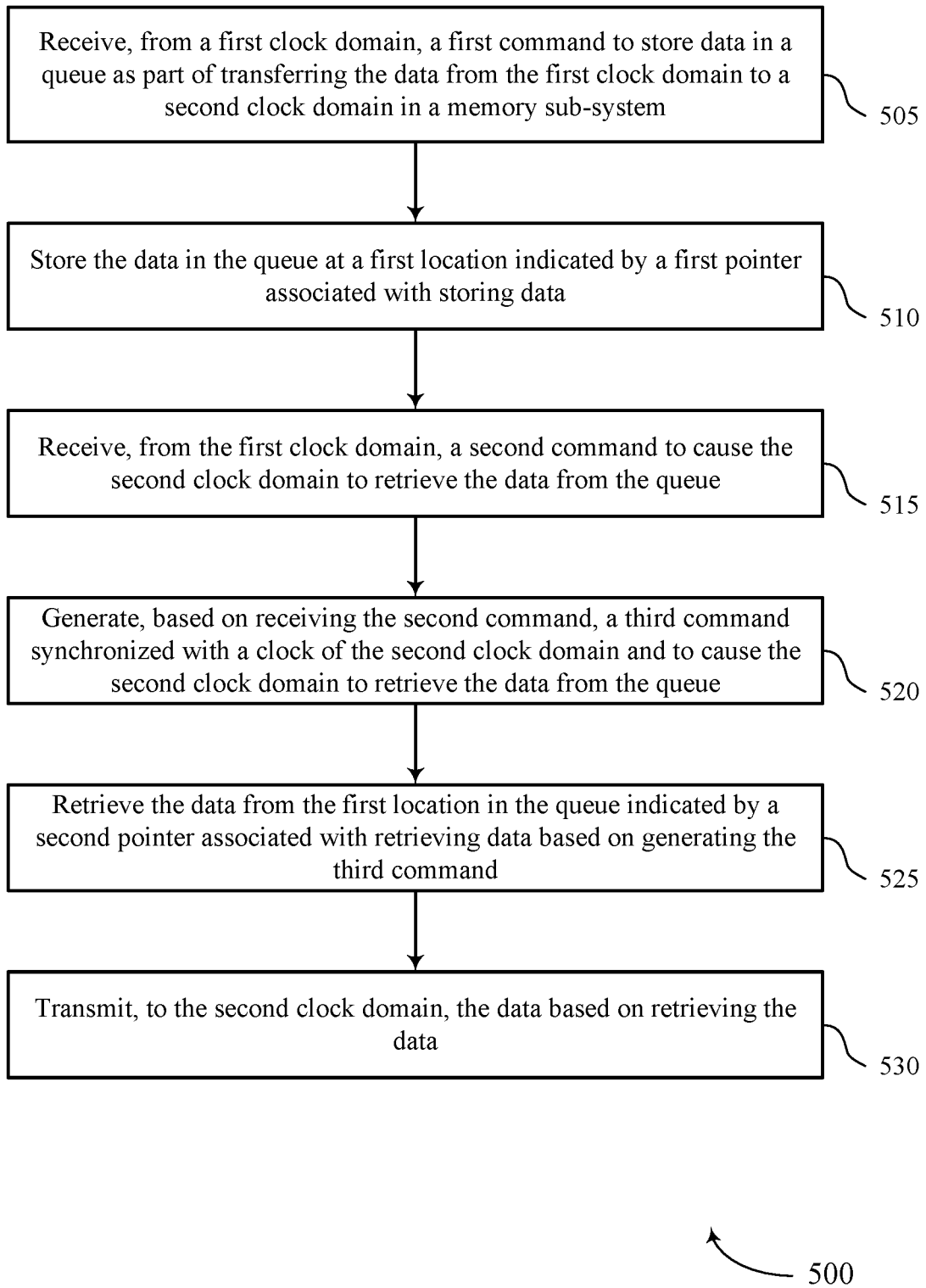
FIGS. 5 and 6 illustrate flowcharts showing a method or methods that support a clock domain crossing queue in accordance with examples as disclosed herein.

FIG. 5 shows a flowchart illustrating a method or methods 500 that supports a clock domain crossing queue in accordance with examples as disclosed herein. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by queue 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 505, the queue can receive, from a first clock domain, a first command to store data in a queue as part of transferring the data from the first clock domain to a second clock domain in a memory sub-system.

At 510, the queue can store the data in the queue at a first location indicated by a first pointer associated with storing data. The data can be stored in a data store on a memory device or other component on the memory sub-system.

At 515, the queue can receive, from the first clock domain, a second command to cause the second clock domain to retrieve the data from the queue.

At 520, the queue can generate, based on receiving the second command, a third command synchronized with a clock of the second clock domain and to cause the second clock domain to retrieve the data from the queue.

At 525, the queue can retrieve the data from the first location in the queue indicated by a second pointer associated with retrieving data based on generating the third command.

At 530, the queue can transmit, to the second clock domain, the data based on retrieving the data.

In some examples, an apparatus as described herein can perform a method or methods, such as the method 500. The apparatus may include a controller that is operable to cause the apparatus to perform the methods described herein. For example, the controller may cause the apparatus to receive, from a first clock domain, a first command to store data in a queue as part of transferring the data from the first clock domain to a second clock domain in a memory device including one or more chalcogenide storage elements, store the data in the queue at a first location indicated by a first pointer associated with storing data, receive, from the first clock domain, a second command to cause the second clock domain to retrieve the data from the queue, generate, based on receiving the second command, a third command synchronized with a clock of the second clock domain and to cause the second clock domain to retrieve the data from the queue, retrieve the data from the first location in the queue indicated by a second pointer associated with retrieving data based on generating the third command, and transmit, to the second clock domain, the data based on retrieving the data.

In other examples, the apparatus can include features, means, or instructions (e.g., a non-transitory computer-readable medium storing instructions executable by a processor) for performing the features of the methods described herein.

Figure 6:
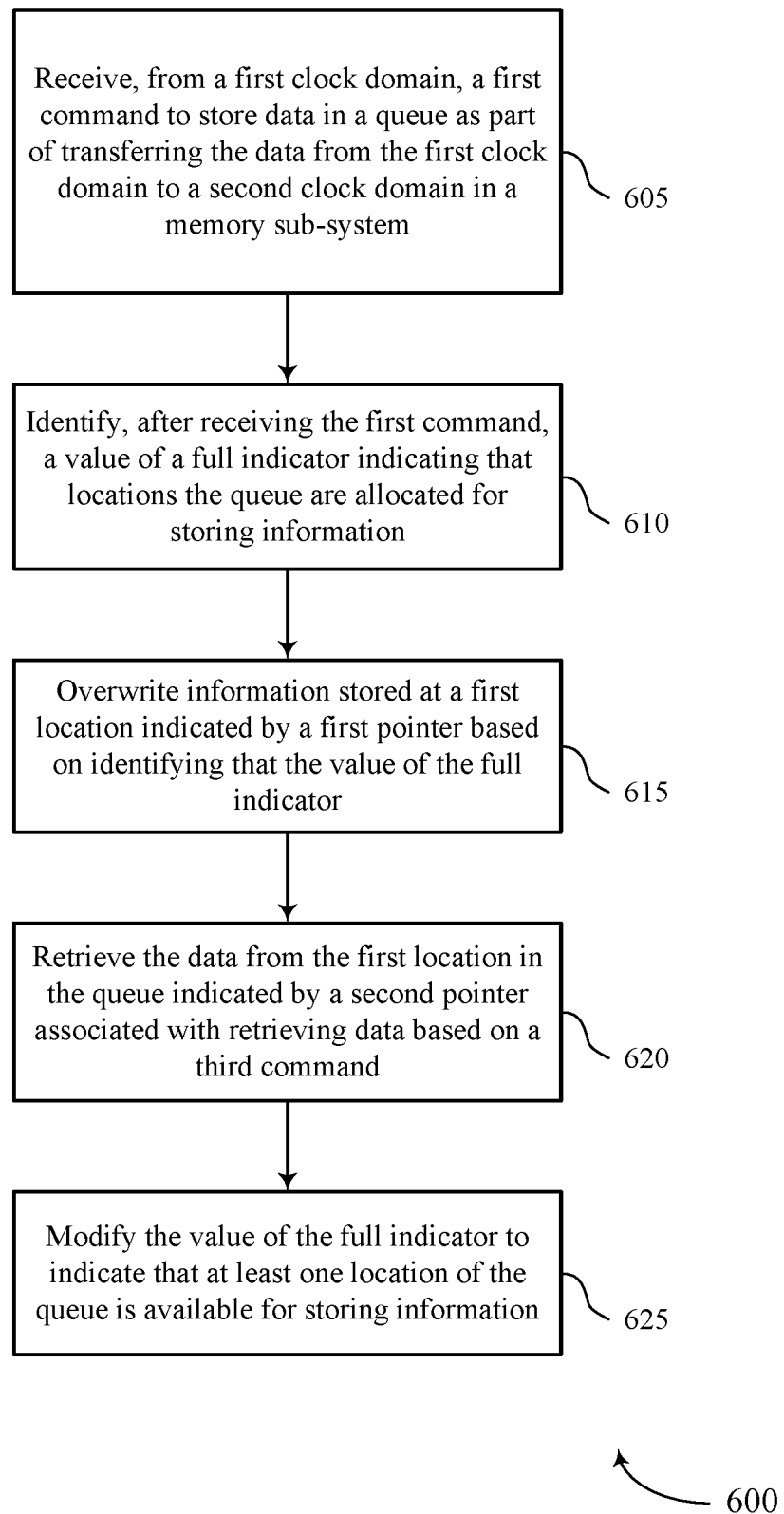

FIG. 6 shows a flowchart illustrating a method or methods 600 that supports a clock domain crossing queue in accordance with examples as disclosed herein. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by queue 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 605, the queue can receive, from a first clock domain, a first command to store data in a queue as part of transferring the data from the first clock domain to a second clock domain in a memory sub-system.

At 610, the queue can identify, after receiving the first command, a value of a full indicator indicating that locations of the queue are allocated for storing information.

At 615, the queue can overwrite information stored at a first location indicated by a first pointer based on identifying that the value of the full indicator.

At 620, the queue can retrieve the data from the first location in the queue indicated by a second pointer associated with retrieving data based on a third command.

At 625, the queue can modify the value of the full indicator to indicate that at least one location of the queue is available for storing information.

In some examples, an apparatus as described herein can perform a method or methods, such as the method 600. The apparatus can include features, means, or instructions (e.g., a non-transitory computer-readable medium storing instructions executable by a processor) for receiving, from a first clock domain, a first command to store data in a queue as part of transferring the data from the first clock domain to a second clock domain in a memory device including one or more chalcogenide storage elements, identifying, after receiving the first command, a value of a full indicator indicating that locations of the queue are allocated for storing information, overwriting information stored at a first location indicated by a first pointer based on identifying that the value of the full indicator, retrieving the data from the first location in the queue indicated by a second pointer associated with retrieving data based on a third command, and modifying the value of the full indicator to indicate that at least one location of the queue is available for storing information.

Some examples of the method 600 and the apparatus described herein can further include operations, features, means, or instructions for receiving, from the first clock domain and before retrieving the data, a fourth command to store a second set of data in the queue, identifying, after receiving the fourth command, the value of the full indicator, and overwriting information stored at the first location based on identifying that the value of the full indicator, where the data retrieved can be the second set of data overwritten into the first location. In some examples of the method 600 and the apparatus described herein, the first location of the queue can be overwritten with new data until the value of the full indicator indicates that at least one location of the queue can be available for storing information.

It should be noted that the methods described above describe possible implementations, and that the operations and the steps can be rearranged or otherwise modified and that other implementations are possible. Furthermore, portions from two or more of the methods can be combined.

Figure 7:
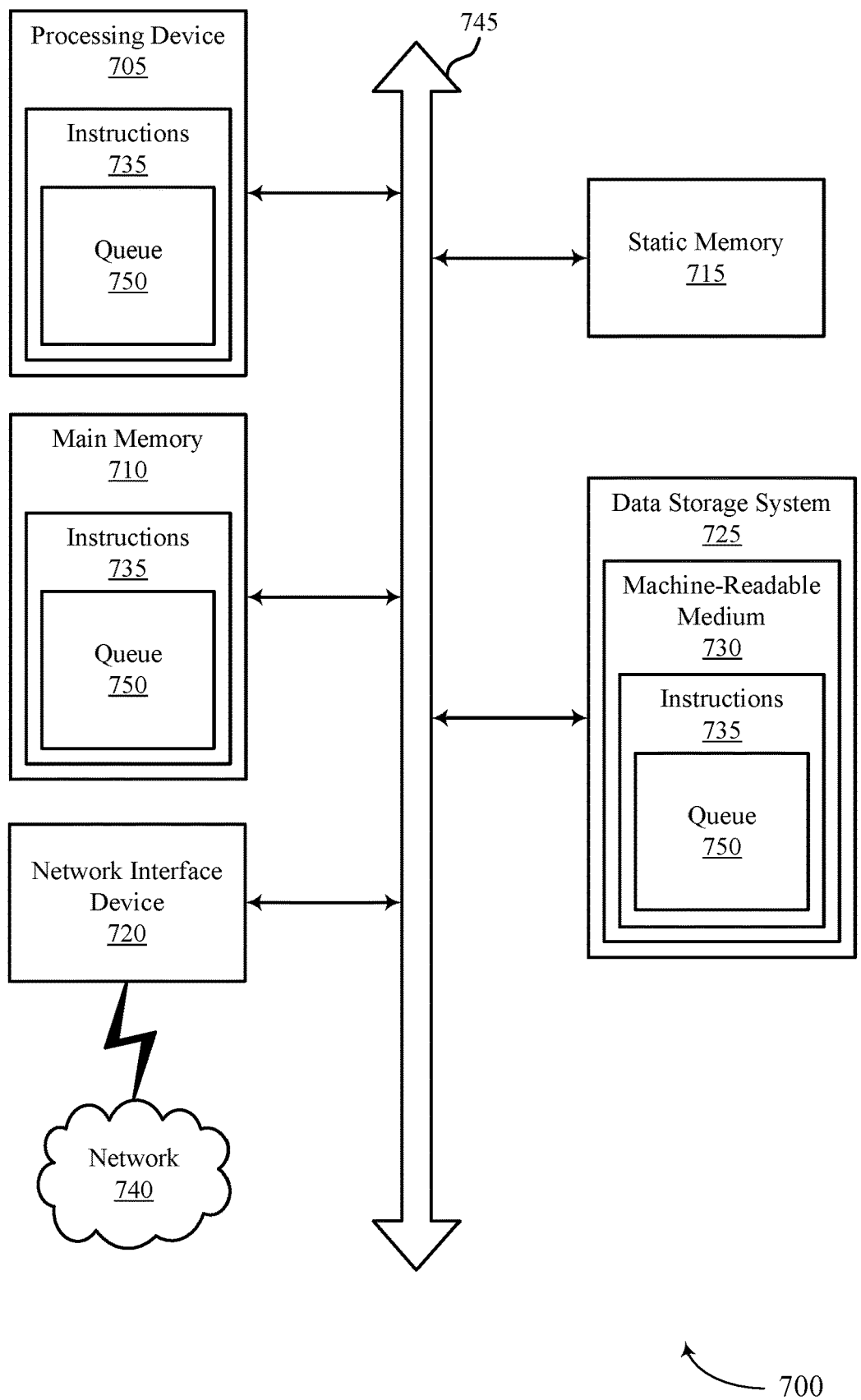
FIG. 7 illustrates an example of a computer system that supports a clock domain crossing queue in accordance with examples as disclosed herein.

FIG. 7 illustrates an example machine of a computer system 700 that supports a clock domain crossing queue in accordance with examples as disclosed herein. The computer system 700 can include a set of instructions, for causing the machine to perform any one or more of the techniques described herein. In some examples, the computer system 700 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the queue 150 described with reference to FIG. 1). In some examples, the machine can be connected (e.g., networked) with other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 700 can include a processing device 705, a main memory 710 (e.g., read-only memory (ROM), flash memory, DRAM such as synchronous DRAM (SDRAM) or RDRAM, etc.), a static memory 715 (e.g., flash memory, static random access memory (SRAM), etc.), and a data storage system 725, which communicate with each other via a bus 745.

Processing device 705 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 705 can also be one or more special-purpose processing devices such as an ASIC, a FPGA, a digital signal processor (DSP), network processor, or the like. The processing device 705 is configured to execute instructions 735 for performing the operations and steps discussed herein. The computer system 700 can further include a network interface device 720 to communicate over the network 740.

The data storage system 725 can include a machine-readable storage medium 730 (also known as a computer-readable medium) on which is stored one or more sets of instructions 735 or software embodying any one or more of the methodologies or functions described herein. The instructions 735 can also reside, completely or at least partially, within the main memory 710 and/or within the processing device 705 during execution thereof by the computer system 700, the main memory 710 and the processing device 705 also constituting machine-readable storage media. The machine-readable storage medium 730, data storage system 725, and/or main memory 710 can correspond to a memory sub-system.

In one example, the instructions 735 include instructions to implement functionality corresponding to a queue 750 (e.g., the queue 150, 205, and 505 described with reference to FIGS. 1-7). While the machine-readable storage medium 730 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

An apparatus is described. The apparatus can include an array of memory cells including one or more chalcogenide storage elements, a first component associated with the array of memory cells and having a first clock domain, a second component associated with the array of memory cells and having a second clock domain, a queue coupled with the first component and the second component and configured to transform information from the first clock domain to the second clock domain. The queue can include a storage component including a first location and a second location for storing information and configured to store the data at the first location indicated by a first pointer, a pulse synchronizer configured to generate a third command synchronized with a clock of the second clock domain based on receiving the second command, a retriever configured to retrieve the data from the first location of the storage component indicated by a second pointer associated with retrieving data based on generating the third command, and a transmitter configured to transmit the data to the second component based on retrieving the data.

Some examples can further include synchronizing the second command with a clock of the first clock domain to generate a notification to notify the first component that the data can be retrieved from the storage component based on generating the third command.

In some examples, the queue further can include operations, features, means, or instructions for a pointer component configured to modify a value of the first pointer from the first location to the second location based on values of a first indicator and a second indicator and storing the data in the first location, and to modify a value of the second pointer from the first location to the second location based on retrieving the data.

In some examples, the queue further can include operations, features, means, or instructions for an indicator component configured to modify one or more of a first value of a first indicator or a second value of a second indicator based on storing or retrieving the data, the first indicator configured to indicate that every location of the queue can be available for storing information, the second indicator configured to indicate that every location of the queue can be storing information. In some examples, the storage component includes one or more chalcogenide storage elements.

Information and signals described herein can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof. Some drawings can illustrate signals as a single signal; however, it will be understood by a person of ordinary skill in the art that the signal can represent a bus of signals, where the bus can have a variety of bit widths.

As used herein, the term "virtual ground" refers to a node of an electrical circuit that is held at a voltage of approximately zero volts (0V) but that is not directly coupled with ground. Accordingly, the voltage of a virtual ground can temporarily fluctuate and return to approximately 0V at steady state. A virtual ground can be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" can refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) can be an open circuit or a closed circuit based on the operation of the device that includes the connected components. The conductive path between connected components can be a direct conductive path between the components or the conductive path between connected components can be an indirect conductive path that can include intermediate components, such as switches, transistors, or other components. In some cases, the flow of signals between the connected components can be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "electrode" can refer to an electrical conductor, and in some cases, can be employed as an electrical contact to a memory cell or other component of a memory array. An electrode can include a trace, wire, conductive line, conductive layer, or the like that provides a conductive path between elements or components of memory array.

The devices discussed herein, including a memory array, can be formed on a semiconductor substrate, such as silicon, germanium, silicon-germanium alloy, gallium arsenide, gallium nitride, etc. In some cases, the substrate is a semiconductor wafer. In other cases, the substrate can be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, can be controlled through doping using various chemical species including, but not limited to, phosphorous, boron, or arsenic. Doping can be performed during the initial formation or growth of the substrate, by ion-implantation, or by any other doping means.

A switching component or a transistor discussed herein can represent a field-effect transistor (FET) and comprise a three terminal device including a source, drain, and gate. The terminals can be connected to other electronic elements through conductive materials, e.g., metals. The source and drain can be conductive and can comprise a heavily-doped, e.g., degenerate, semiconductor region. The source and drain can be separated by a lightly-doped semiconductor region or channel. If the channel is n-type (i.e., majority carriers are signals), then the FET can be referred to as a n-type FET. If the channel is p-type (i.e., majority carriers are holes), then the FET can be referred to as a p-type FET. The channel can be capped by an insulating gate oxide. The channel conductivity can be controlled by applying a voltage to the gate. For example, applying a positive voltage or negative voltage to an n-type FET or a p-type FET, respectively, can result in the channel becoming conductive. A transistor can be "on" or "activated" when a voltage greater than or equal to the transistor's threshold voltage is applied to the transistor gate. The transistor can be "off" or "deactivated" when a voltage less than the transistor's threshold voltage is applied to the transistor gate.

The description set forth herein, in connection with the appended drawings, describes example configurations and does not represent all the examples that can be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, can be practiced without these specific details. In some instances, well-known structures and devices are shown in block diagram form to avoid obscuring the concepts of the described examples.

In the appended figures, similar components or features can have the same reference label. Further, various components of the same type can be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein can be implemented or performed with a general-purpose processor, a DSP, an ASIC, an FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices (e.g., a combination of a DSP and a microprocessor, multiple microprocessors, one or more microprocessors in conjunction with a DSP core, or any other such configuration).

The functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions can also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" can be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium can be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein can be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, from a first clock domain, a first command to store data in a queue as part of transferring the data from the first clock domain to a second clock domain in a memory sub-system;
identifying, after receiving the first command, a value of an indicator configured to indicate whether the queue is full, the value indicating that the queue is full;
storing the data in the queue at a first location indicated by a first pointer associated with storing data based at least in part on the queue being full, wherein storing the data overwrites information previously stored at the first location;
receiving, from the first clock domain, a second command to cause the second clock domain to retrieve the data from the queue;
generating, based at least in part on receiving the second command, a third command synchronized with a clock of the second clock domain and to cause the second clock domain to retrieve the data from the queue;
retrieving the data from the first location of the queue indicated by a second pointer associated with retrieving data based at least in part on generating the third command; and
transmitting, to the second clock domain, the data based at least in part on retrieving the data.

2. The method of claim 1, further comprising:
generating a notification to notify the first clock domain that the data has been retrieved from the queue based at least in part on generating the third command; and
synchronizing, using a pulse synchronizer, the third command with a clock of the first clock domain, wherein generating the notification is based at least in part on synchronizing the second command with the first clock domain.

3. The method of claim 1, further comprising:
modifying a value of the second pointer from the first location to a second location based at least in part on retrieving the data.

4. The method of claim 1, further comprising:
synchronizing, using a pulse synchronizer, the second command with the second clock domain, wherein generating the third command is based at least in part on synchronizing the second command with the second clock domain.

5. The method of claim 1, further comprising:
determining, after retrieving the data from the first location, that every location of the queue is available for storing information; and
setting a value of a second indicator to indicate that the queue is empty, based at least in part on determining that every location of the queue is available for storing information.

6. The method of claim 1, further comprising:
determining, after storing the data in the first location, that the queue is available to store information using the indicator; and
modifying a value of the first pointer from the first location to a second location of the queue based at least in part on storing the data and determining that the queue is available to store information.

7. The method of claim 1, further comprising:
determining, after storing the data in the first location, that the queue is full using the indicator, wherein the first pointer remains at the first location based at least in part on determining that the queue is full.

8. The method of claim 1, further comprising:
identifying, after storing the data in the first location, a value of a first indicator configured to indicate that every location of the queue is available for storing information, wherein the value indicates that every location of the queue is available;
modifying the value of the first indicator based at least in part on storing the data in the first location; and
modifying a value of the first pointer from the first location to a second location of the queue based at least in part on identifying the value of the first indicator.

9. The method of claim 1, further comprising:
identifying, after storing the data in the first location, a first value of a first indicator configured to indicate that every location of the queue is available for storing information, wherein the first value indicates that at least one location of the queue stores information;
identifying, after storing the data in the first location, a second value of the indicator, wherein the second value indicates that the queue is available to store information;
modifying the second value of the indicator based at least in part on storing the data in the first location; and
modifying a value of the first pointer from the first location to a second location of the queue based at least in part on identifying the first value of the first indicator and the second value of the indicator.

10. The method of claim 1, further comprising:
identifying, after storing the data in the first location, the value of the indicator indicates that the queue is full; and
keeping the first pointer at the first location based at least in part on identifying the value of the indicator.

11. The method of claim 1, further comprising:
identifying, after retrieving the data from the first location, a first value of a first indicator configured to indicate that every location of the queue is available for storing information, wherein the first value indicates that at least one location of the queue stores information;
identifying, after retrieving the data from the first location, a second value of the indicator indicates that the queue is available to store information; and
modifying the first value of the first indicator based at least in part on retrieving the data from the first location.

12. The method of claim 1, further comprising:
identifying, after retrieving the data from the first location, the value of the indicator indicates that the queue is full; and
modifying the value of the indicator based at least in part on retrieving the data from the first location.

13. The method of claim 1, further comprising:
transmitting, to the first clock domain, a notification indicating the data has been retrieved from the queue; and
receiving a fourth command to cause the second clock domain to retrieve a second set of data from the queue, the fourth command received concurrently with transmitting the notification.

14. An apparatus, comprising:
an array of memory cells comprising one or more chalcogenide storage elements;
a first component associated with the array of memory cells and having a first clock domain;
a second component associated with the array of memory cells and having a second clock domain;
a queue coupled with the first component and the second component and configured to transform information from the first clock domain to the second clock domain, wherein the queue further comprises:
  a receiver configured to receive a first command to store data in the queue from the first component and to receive a second command to cause the second component to retrieve the data;
  an indicator component configured to modify a value of an indicator based at least in part on storing or retrieving the data, the indicator configured to indicate whether the queue is full;
  a storage component comprising a first location and a second location for storing information and configured to store the data at the first location indicated by a first pointer and to overwrite information previously stored in the first location based on the indicator indicating that the queue is full;
  a pulse synchronizer configured to generate a third command for the second component to retrieve the data from the queue, the third command synchronized with a clock of the second clock domain and based at least in part on receiving the second command;
  a retriever configured to retrieve the data from the first location of the storage component indicated by a second pointer associated with retrieving data based at least in part on generating the third command; and
  a transmitter configured to transmit the data to the second component based at least in part on retrieving the data.

15. The apparatus of claim 14, wherein the pulse synchronizer is configured to:
synchronize the second command with a clock of the first clock domain to generate a notification to notify the first component that the data has been retrieved from the storage component based at least in part on generating the third command.

16. The apparatus of claim 14, wherein:
the queue further comprises a pointer component configured to modify a value of the first pointer from the first location to the second location based at least in part on values of the indicator and a second indicator and storing the data in the first location, and to modify a value of the second pointer from the first location to the second location based at least in part on retrieving the data; and
the indicator component is further configured to modify a second value of the second indicator based at least in part on storing or retrieving the data, the second indicator configured to indicate whether the queue is empty.

17. A method, comprising:
receiving, from a first clock domain, a first command to store data in a queue as part of transferring the data from the first clock domain to a second clock domain in a memory sub-system;
identifying, after receiving the first command, a value of a full indicator, the value indicating that the queue is full;
overwriting information previously stored at a first location of the queue indicated by a first pointer based at least in part on identifying the value of the full indicator indicates that the queue is full;
retrieving, based at least in part on a third command, the data from the first location of the queue indicated by a second pointer associated with retrieving data from the queue; and
modifying the value of the full indicator to indicate that the queue is available for storing information.

18. The method of claim 17, further comprising:
receiving, from the first clock domain and before retrieving the data, a fourth command to store a second set of data in the queue;
identifying, after receiving the fourth command, the value of the full indicator indicating that the queue is full; and
overwriting information stored at the first location of the queue based at least in part on identifying the value of the full indicator indicating that the queue is full, wherein the data retrieved is the second set of data overwritten into the first location of the queue.

19. The method of claim 17, wherein the first location of the queue is overwritten with new data until the value of the full indicator indicates that at least one location of the queue is available for storing information.

* * * * *